United States Patent
Abdellatif et al.

(10) Patent No.: US 12,000,800 B2
(45) Date of Patent: Jun. 4, 2024

(54) SYSTEM AND METHOD FOR PASSIVE NORMALIZATION OF A PROBE

(71) Applicants: Saudi Arabian Oil Company, Dhahran (SA); KING ABDULLAH UNIVERSITY OF SCIENCE AND TECHNOLOGY, Thuwal (SA)

(72) Inventors: Fadl Abdellatif, Thuwal (SA); Hesham A. Jifri, Thuwal (SA); Sahejad Patel, Thuwal (SA); Ali Alrasheed, Thuwal (SA); Amjad Felemban, Thuwal (SA); Jeff S. Shamma, Thuwal (SA)

(73) Assignees: SAUDI ARABIAN OIL COMPANY, Dhahran (SA); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 18/299,292

(22) Filed: Apr. 12, 2023

(65) Prior Publication Data
US 2023/0243782 A1  Aug. 3, 2023

Related U.S. Application Data

(63) Continuation of application No. 17/107,829, filed on Nov. 30, 2020, now Pat. No. 11,650,185.

(51) Int. Cl.
| | | |
|---|---|---|
| *G01N 29/24* | (2006.01) | |
| *G01N 29/22* | (2006.01) | |
| *G01N 29/265* | (2006.01) | |

(52) U.S. Cl.
CPC ....... *G01N 29/2493* (2013.01); *G01N 29/225* (2013.01); *G01N 29/265* (2013.01); *G01N 2291/2626* (2013.01)

(58) Field of Classification Search
CPC ............ G01N 29/2493; G01N 29/225; G01N 29/265; G01N 29/04; G01N 2291/2638; G01N 2291/2634; G01N 2291/2626
USPC ........................................... 73/639
See application file for complete search history.

(56) References Cited

U.S. PATENT DOCUMENTS

| | | |
|---|---|---|
| 4,270,389 A | 6/1981 | Shiraiwa et al. |
| 4,924,707 A | 5/1990 | Kliesch |
| 5,121,694 A | 6/1992 | Zollinger |
| 6,792,809 B1 | 9/2004 | Moore |
| 7,159,477 B2 | 1/2007 | Edwin et al. |

(Continued)

FOREIGN PATENT DOCUMENTS

| | | |
|---|---|---|
| EP | 0001474 A1 | 4/1979 |
| EP | 3187871 A1 | 7/2017 |

(Continued)

OTHER PUBLICATIONS

"Olympus RollerFORM Phased Array Wheel Probe Overview. Olympus IMS, Jul. 15, 2014, www.youtube.com/watch?v=vUlkWgTs_J0."

(Continued)

*Primary Examiner* — Jacques M Saint Surin
(74) *Attorney, Agent, or Firm* — Leason Ellis LLP (57) ABSTRACT

A system and method passively normalize an ultrasonic dry coupled wheel probe as the probe traverses a surface of a structure to inspect the structure, such as a flat structure or (Continued)

a curved pipe. At least a pair of arms are configured to passively maintain normalization of the probe in a detection direction normal to the surface.

13 Claims, 7 Drawing Sheets

(56) References Cited

U.S. PATENT DOCUMENTS

| | | | |
|---|---|---|---|
| 8,590,383 | B2 | 11/2013 | Brignac et al. |
| 9,201,047 | B1 | 12/2015 | Walton |
| 9,746,446 | B2 | 8/2017 | Faucher |
| 10,012,618 | B2 | 7/2018 | Zanini et al. |
| 10,317,372 | B2 | 6/2019 | Carrasco Zanini et al. |
| 10,343,276 | B2 | 7/2019 | Zanini et al. |
| 10,451,222 | B2 | 10/2019 | Zanini et al. |
| 11,021,197 | B2 | 6/2021 | Carrasco Zanini et al. |
| 11,021,198 | B2 | 6/2021 | Carrasco Zanini et al. |
| 11,650,185 | B2 * | 5/2023 | Abdellatif ............ G01N 29/225 73/639 |
| 2006/0191358 | A1 | 8/2006 | Wiggenhauser et al. |
| 2008/0066553 | A1 | 3/2008 | Espada Tejedor |
| 2019/0017656 | A1 | 1/2019 | Zanini |
| 2020/0172184 | A1 | 6/2020 | Abdellatif et al. |
| 2020/0172232 | A1 | 6/2020 | Abdellatif et al. |
| 2022/0176736 | A1 | 6/2022 | Abdellatif |

FOREIGN PATENT DOCUMENTS

| | | |
|---|---|---|
| WO | 2012131334 A1 | 10/2012 |
| WO | 2018056820 A2 | 3/2018 |

OTHER PUBLICATIONS

International Search Report and Written Opinion in corresponding PCT Application No. PCT/US2021/061063 dated Feb. 28, 2022; 11 pages.
Saudi Arabian Office Action in corresponding SA Application No. 121430378 , dated Sep. 26, 2022; 12 pages.
International Preliminary Report on Patentability for corresponding International Patent Application No. PCT/US21/61063 dated May 30, 2023. 7 pages.

* cited by examiner

SYSTEM AND METHOD FOR PASSIVE NORMALIZATION OF A PROBE

CROSS-REFERENCE TO RELATED APPLICATION

This application is a Continuation of, and claims priority from, U.S. patent application Ser. No. 17/107,829, titled SYSTEM AND METHOD FOR PASSIVE NORMALIZATION OF A PROBE, filed on Nov. 30, 2020, which is hereby incorporated by reference in its entirety.

FIELD OF THE DISCLOSURE

The present disclosure relates generally to wheel probes for inspecting a structure, and, more particularly, to a system and method for passive normalization of an ultrasonic dry coupled wheel probe as the probe inspects a structure.

BACKGROUND OF THE DISCLOSURE

In various technical fields, such as the oil and gas industry, pipelines and other structures are inspected using sensors. In ultrasonic testing (UT), such sensors utilize ultrasonic waves to penetrate the surface of structures. UT-based sensors are known for providing a non-destructive testing technique for such inspections of structures. For example, when inspecting a steel structure such as a steel pipe, a UT-based sensor traverses the surface of the structure to measure the thickness of the steel to determine whether the thickness has reduced below a certain critical limit due to erosion. By periodically performing such non-destructive and surface penetrating inspections, the steel structure can be evaluated to avoid leaks, failures, and unplanned shutdowns of the pipe during operation.

UT-based sensors can be directional sensors, such as ultrasonic dry coupled wheel probes. Such wheel probes are capable of traversing any type of surface, such as a flat surface or a curved surface of a pipe. The wheel probes can be incorporated into a crawler-type device which moves upon the surface of the structure being inspected. However, such directional sensors require normalization of the sensors in order to ensure that the generated ultrasonic waves from the probe are directed normal, that is, perpendicular to the surface under test. Such normal emissions permit the reflection of the ultrasonic waves from the structure to be redirected back to the sensor. A slight inclination of the direction of the emission of the ultrasonic waves can cause the loss of the reflected signal. Accordingly, recalibration of known probes with sensors is often required as the probes traverse surfaces having different curvatures.

One technique to recalibrate a probe is to use an actuator for actively normalizing the probe towards a given surface. However, such actuators increase the size and cost of the probe or the crawler in which the probe is mounted. In addition, such actuators must be activated every time for different curvatures of the surface under test. It is in respect of these problems in the art that the present disclosure is directed.

SUMMARY OF THE DISCLOSURE

According to an embodiment consistent with the present disclosure, a system and method passively normalize an ultrasonic dry coupled wheel probe as the probe traverses a surface of a structure to inspect the structure, such as a flat structure or a curved pipe. At least a pair of arms are configured to passively maintain normalization of the probe in a detection direction normal to the surface.

In an embodiment, an assembly configured to hold a probe adjacent to a test surface. The assembly comprises a first connector, first and second arms, a pair of first mounting members, a pair of first wheels, and a holder. The first arm is pivotably coupled to the first connector at a first end thereof. The first arm extends in a forward direction and extends in a normal direction perpendicular to the forward direction and normal to the test surface. Similarly, the second arm is pivotably coupled to the first connector at a first end thereof. The second arm extends in a rearward direction opposite to the forward direction and extending in the normal direction.

In a more particular embodiment, each of the pair of first mounting members is coupled to a respective second end of the first and second arms, each of the pair of first wheels is coupled to a respective first mounting member, the holder is coupled to the first connector and is configured to hold the probe, the pivotable coupling of the first and second arms to the first connector passively normalizes a detection direction of the probe as the probe traverses the test surface, or a combination of these further arrangements can be used in a given embodiment.

In additional, particular embodiments, the first connector can include a first pinion gear, the pair of first wheels can be casters, the holder can be coupled to a rotating shaft of the probe and can be configured to allow the probe to rotate around the rotating shaft, a first resilient member can connect to each of the first and second arms and the first resilient member can be configured to bias the first and second arms towards each other, the first and second arms can pivot with a first degree of freedom in the forward and rearward directions, respectively, or a combination of these further arrangements can be used in a given embodiment, including with any of the embodiments described above In an alternative embodiment, the assembly includes a second connector, third and fourth arms, a pair of second mounting members, and a pair of second wheels. The third arm is pivotably coupled to the second connector. The third arm extends in a right direction and extends in the normal direction. Similarly, a fourth arm is pivotably coupled to the second connector. The fourth arm extends in a left direction opposite to the right direction and extends in the normal direction. Each of the pair of second mounting members is coupled to a respective second end of the third and fourth arms. Each of the pair of second wheels is coupled to a respective second mounting member. Each of the right and left directions is perpendicular to both of the forward direction and the normal direction. The third and fourth arms pivot with a second degree of freedom in the right and left directions, respectively.

In another embodiment, a system is configured to traverse a test surface. The system includes a housing, a drive wheel rotatably coupled to the housing and configured to traverse the test surface, and an assembly disposed within the housing. The assembly comprises a first connector, first and second arms, a pair of first mounting members, a pair of first wheels, and a holder. The first arm is pivotably coupled to the first connector at a first end thereof. The first arm extends in a forward direction and extends in a normal direction perpendicular to the forward direction and normal to the test surface. Similarly, the second arm is pivotably coupled to the first connector at a first end thereof. The second arm extends in a rearward direction opposite to the forward direction and extending in the normal direction. The pivotable coupling of the first and second arms to the first connector passively normalizes a detection direction of the probe towards the test surface as the system with the probe traverses the test surface in response to rotation of the drive wheel.

In more particular embodiments, a system as described above can include a linear motion guide configured to guide the assembly linearly relative to the housing. The system can further include a compression-based resilient member disposed between a top surface of the assembly and an interior surface of the housing. The pair of first wheels can be casters. The holder can be coupled to a rotating shaft of the probe and configured to allow the probe to rotate around the rotating shaft. A first resilient member can be connected to each of the first and second arms. The first resilient member can be configured to bias the first and second arms towards each other. A given embodiment can include any one or more of the foregoing further features, connections and arrangements.

In a further embodiment, a method is configured to inspect a test surface. The method comprises providing a housing having a drive wheel rotatably coupled to the housing and configured to traverse the test surface, and providing an assembly disposed within the housing. The assembly includes a first connector, a first arm, a second arm, a pair of first mounting members, a pair of first wheels, and a holder. The first arm is pivotably coupled to the first connector at a first end thereof. The first arm extends in a forward direction and extends in a normal direction perpendicular to the forward direction and normal to the test surface. Similarly, a second arm is pivotably coupled to the second connector at a first end thereof. The second arm extends in a rearward direction opposite to the forward direction and extends in the normal direction. Each of the pair of first mounting members is coupled to a respective second end of the first and second arms. Each of the pair of first wheels is coupled to a respective first mounting member. The holder is coupled to the first connector and is configured to hold a probe adjacent to the test surface.

The method according to this disclosure further comprises traversing the test surface by operation of the drive wheel, pivoting the first and second arms, and passively normalizing a detection direction of the probe within the holder towards the test surface as the probe inspects the test surface. In more particular embodiments, the method can further include biasing the first and second arms towards each other by a first resilient member.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method which passively normalize an ultrasonic dry coupled wheel probe as the probe traverses a surface of a structure to inspect the structure, such as a flat structure or a curved pipe. At least a pair of arms are configured to passively maintain normalization of the probe in a detection direction normal to the surface.

Figure 1:
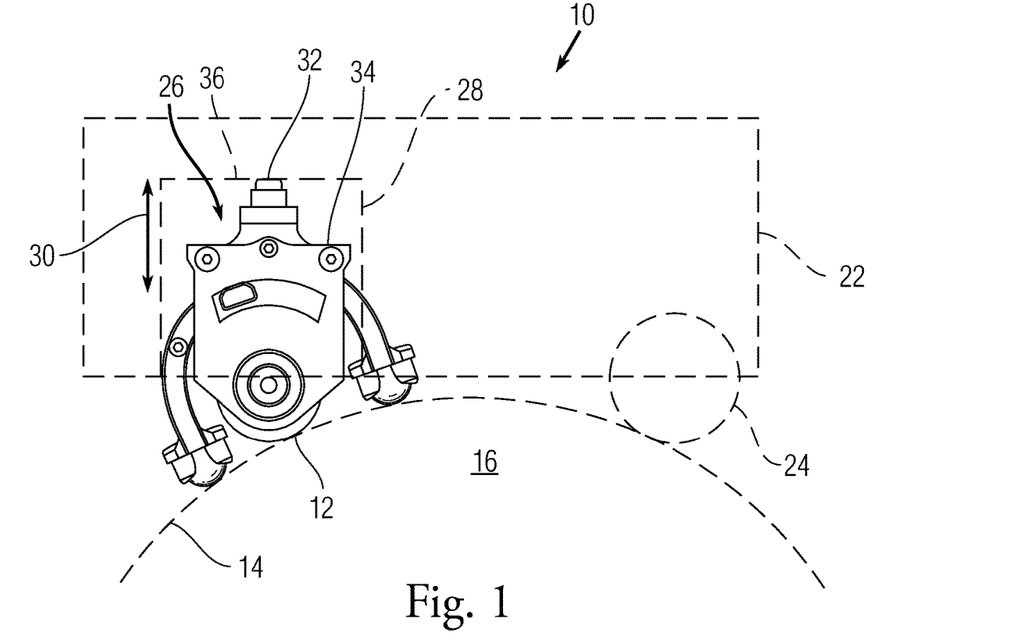
FIG. 1 is a side schematic view of a crawler system having a passive normalization assembly traversing a curved surface, according to an embodiment.
Figure 2:
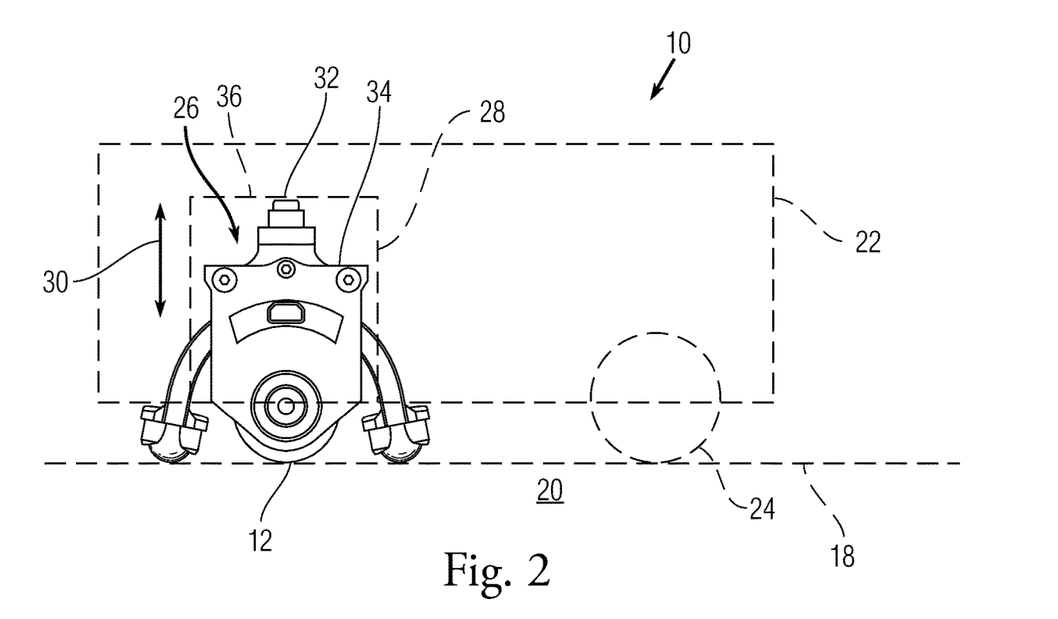
FIG. 2 is a side schematic view of the crawler system of FIG. 1 traversing a flat surface, according to the embodiment.

As shown in FIGS. 1-9 in one embodiment, a system 10 is configured as a crawler device having a probe 12. The system 10 traverses a test surface 14 of a structure 16. The probe 12 is adjacent to the test surface 14 and inspects the structure 16. The probe 12 can be a wheel probe. For example, the probe 12 can be an ultrasonic dry coupled wheel probe. Alternatively, other types of probes can be used as the probe 12. As shown in FIG. 1, the system 10 traverses a curved surface 14. As shown in FIG. 2, the system 10 traverses a substantially flat surface 18 of a structure 20.

As shown in FIGS. 1-2, the system 10 includes a housing 22, a drive wheel 24, and an assembly 26. The drive wheel 24 is rotatably coupled to the housing 22. The drive wheel 24 is configured to traverse the test surface 14, 18. The assembly 26 is disposed within the housing 22. The system 10 can further include a linear motion guide 28 configured to guide the assembly 26 linearly relative to the housing 22, for example, in a vertical direction 30. The linear motion guide 28 can be affixed within the housing 22. The system 10 can further include a compression-based resilient member 32 disposed between a top surface 34 of the assembly 26 and an interior surface 36 of the housing 22, with one surface braced against the top surface 34 or structures that are fixedly attached to the housing 22. The interior surface 36 can be an undersurface of the linear motion guide 28. The compression-based resilient member 32 can allow the assembly 26 to move upward and downward against the restoring force of the resilient member. The resilient member 32 provides a pushing force downwards on the assembly 26. The pushing force ensures the probe 12 maintains contact with the surface 14, 18 as the system 10 moves along the surface 14, 18 regardless of changes in the topology of the surface being traversed. The resilient member 32 can also prevent the assembly 26 from hitting against the interior surface 36 as the assembly 26 moves linearly relative to the housing 22. In an alternative embodiment, the resilient member 32 can be a piston-cylinder device filled with compressed gas or vacuum which is arranged to provide a restoring force as described above.

Figure 3:
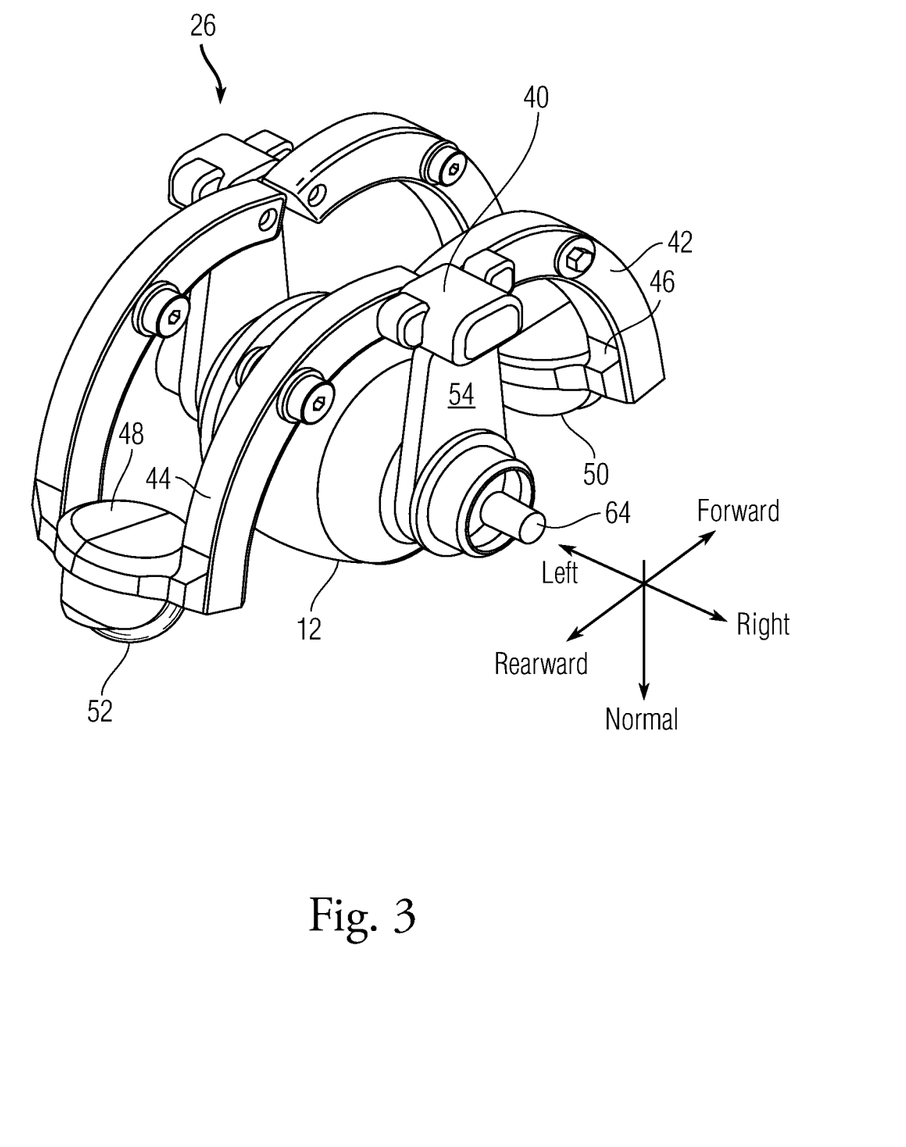
FIG. 3 is a top rear side perspective view of the passive normalization assembly, according to the embodiment.
Figure 6:
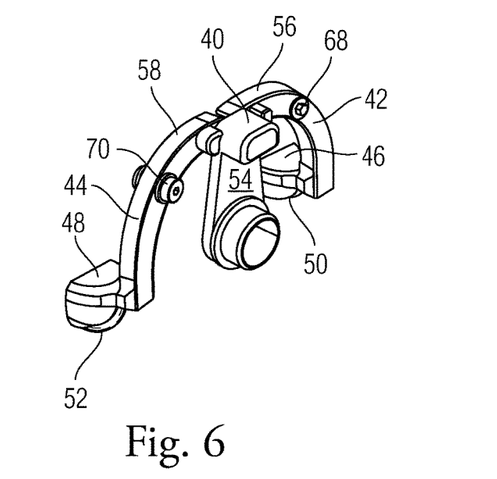
FIG. 6 is a top rear side perspective view of the portion of the passive normalization assembly of FIG. 5 with parts assembled, according to the embodiment.

Referring to FIGS. 3-6, the assembly 26 includes a rightward set of components 40-46, 54-58 which form a rightward portion of the assembly 26, as shown in particular in FIG. 6. Similarly, a leftward set of components of the assembly 26 are mirror images of the rightward set of components 40-46, 54-58. Accordingly, the leftward set of components, once assembled, form a leftward portion of the assembly 26, which is a mirror image of the rightward portion of the assembly 26 shown in FIG. 6. The rightward and leftward portions are then assembled to form the overall assembly 26, as shown in FIG. 3. The rightward and leftward portions can be fastened together at the mounting members 46, 48, described below, using any known fastening mechanism.

Referring to the rightward portion shown in FIGS. 3-6, which is a mirror image of the leftward portion, the assembly 26 comprises a first connector 40, a first arm 42, a second arm 44, a pair of first mounting members 46, 48, a pair of first wheels 50, 52, and a holder 54. The first arm 42 is pivotably coupled to the first connector 40 at a first end 56 thereof. As shown in FIG. 3, the first arm 42 extends in a forward direction, and extends in a normal direction perpendicular to the forward direction and normal to the test surface 14, 18. Similarly, the second arm 44 is pivotably coupled to the first connector 40 at a first end 58 thereof. The second arm 44 extends in a rearward direction opposite to the forward direction and extending in the normal direction. The pivotable coupling of the first arm 42 and the second arm 44 to the first connector 40 passively normalizes a detection direction of the probe 12 towards the test surface 14, 18 as the system 10 with the probe 12 traverses the test surface 14, 18 in response to rotation of the drive wheel 24.

Figure 4:
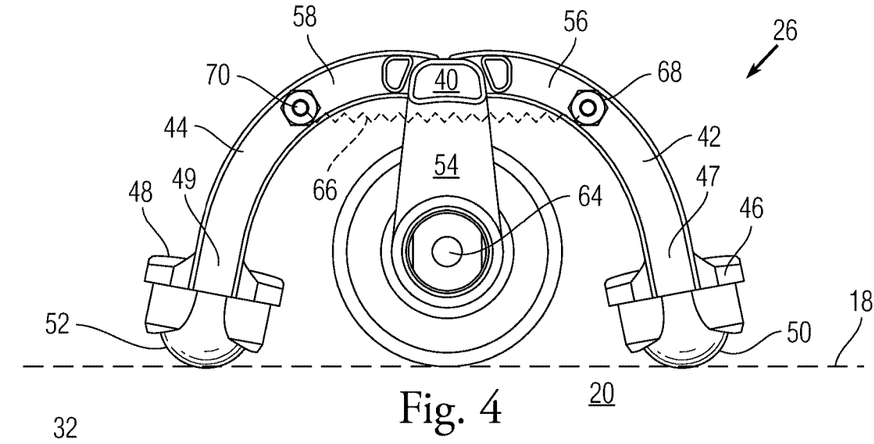
FIG. 4 is a side plan view of the passive normalization assembly of FIG. 3, according to the embodiment.
Figure 5:
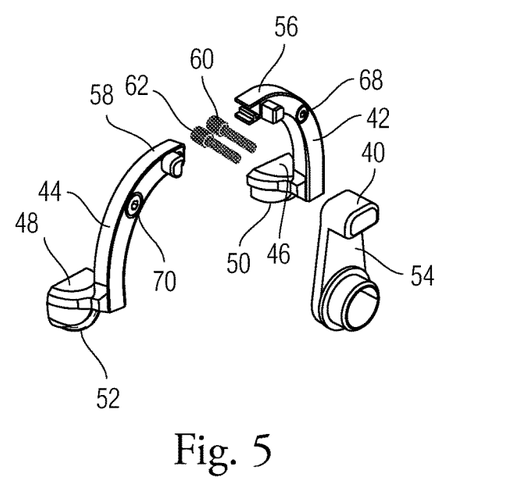
FIG. 5 is a top rear side perspective view of a portion of the passive normalization assembly with parts separated, according to the embodiment.
Figure 7:
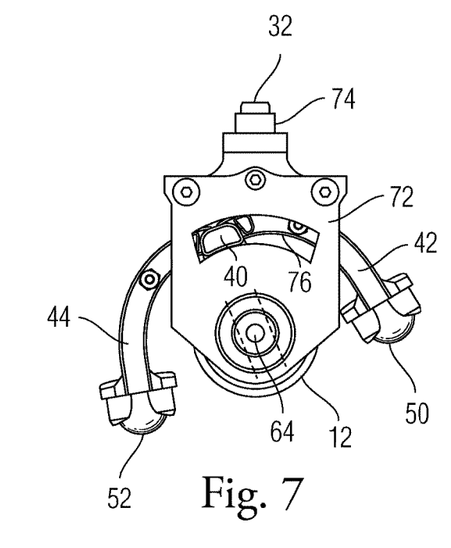
FIG. 7 is a side plan view of the passive normalization assembly of FIG. 3 in a frame in a first configuration, according to the embodiment.
Figure 8:
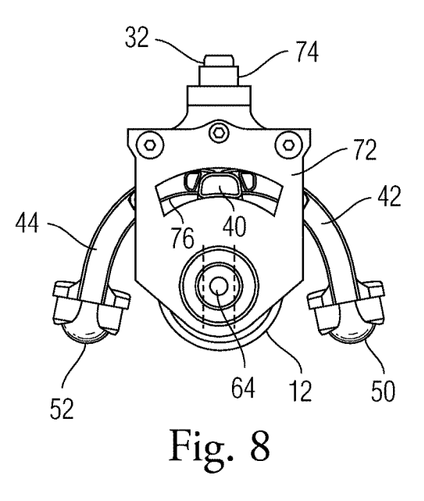
FIG. 8 is a side plan view of the passive normalization assembly of FIG. 3 in a frame in a second configuration, according to the embodiment.
Figure 9:
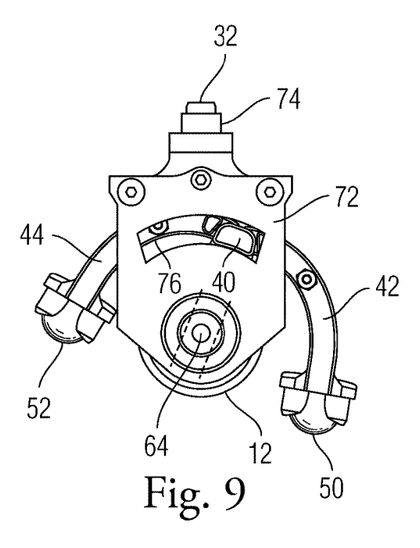
FIG. 9 is a side plan view of the passive normalization assembly of FIG. 3 in a frame in a third configuration, according to the embodiment.

At least one fastener 60, 62 pivotably couples the first ends 56, 58 to the first connector 40, respectively. Each fastener 60, 62 defines a respective pivot point of the arms 42, 44 on the first connector 40. The fasteners 60, 62 can also include pinion gears in a pinion gear assembly. The first ends 56, 58 of the arms 42, 44 are coupled together at the pinion gear assembly. The pinion gear assembly can be rigidly attached to the holder 54, described below, to allow the holder 54 to rotate along with the arms 42, 44, as shown in FIGS. 7-9. Such rotation of the holder 54 adjusts the angle of normalization of the probe 12. Accordingly, when both of the wheels 50, 52 are on the same horizontal surface 18, such as shown in FIGS. 2 and 4, the holder 54 has a vertical or normal orientation to the surface 18. When the wheels 50, 52 are tilted upward or downward due to the curvature of the surface, such as the surface 14 in FIG. 1, the holder 54 has the same tilt angle as the wheels 50, 52 since the holder 54 is rigidly coupled to the arms 42, 44 by the pinion gear assembly at the first connector 40.

The pair of first wheels 50, 52 can be casters held by the mounting members 46, 48, respectively, at second ends 47, 49 of the arms 42, 44, respectively. Alternatively, other known types of wheels can be held by the mounting members 46, 48, such that the wheels are free to rotate and to roll on the test surfaces 14, 18. The configuration of the arms 42, 44 and the respective first wheels 50, 52 as casters balance the assembly 26. Such balancing provides a symmetry-preserving mechanism. As the diameter of the structure 16, 20 changes, and so the curvature of the surface 14, 18 changes, respectively, the preservation of symmetry allows the wheels 50, 52 to stay in contact with the surface 14, 18. In addition, the symmetry of the arms 42, 44 and the wheels 50, 52 also preserves the perpendicularity of the assembly 26 to the surface 14, 18, and so the probe 12 stays normal to the surface 14, 18.

The holder 54 can be coupled to a rotating shaft 64 of the probe 12 and configured to allow the probe 12 to rotate around the rotating shaft 64. As shown in FIG. 4, an optional first resilient member 66 can be connected to each of the arms 42, 44 at fasteners 68, 70 on each respective arm 42, 44. The first resilient member 66 can be a spring, such as a tension spring. The first resilient member 66 can be configured to bias the arms 42, 44 towards each other.

As shown in FIGS. 1-2 and 7-9, the assembly 26 of FIGS. 3-6 can be mounted in a frame 72 having a top member 74 upon which the resilient member 32 is disposed. The frame 72 can also include a guidance slot 76. The guidance slot 76 permits the first connector 40 to move within a limited curved path which defines the location of the pivot point of the arms 42, 44. A center line from a midpoint of the first connector 40 to a center of the shaft 64 substantially defines the normal direction.

In operation, as the wheels 50, 52 traverse the surface 14, 18, the arms 42, 44 pivot about their respective pivot points on the first connector 40, defined by the fasteners 60, 62. The arms 42, 44 flex in a symmetrical manner toward or away from the center line, which passively normalizes the detection direction of the probe 12 to be substantially parallel to the normal direction.

Figure 10:
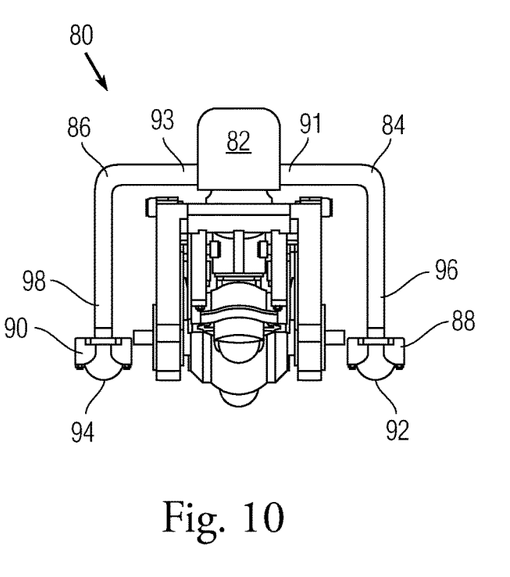
FIG. 10 is a rear plan view of a passive normalization assembly in a frame, according to an alternative embodiment.
Figure 11:
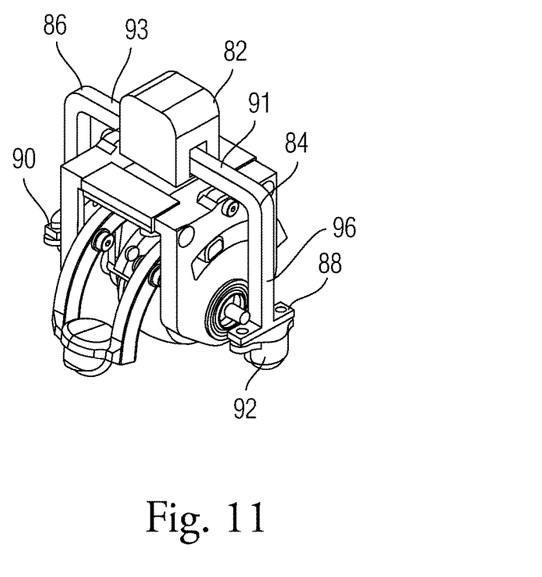
FIG. 11 is a top rear side perspective view of the passive normalization assembly in the frame shown in FIG. 10, according to the alternative embodiment.

In an alternative embodiment shown in FIGS. 10-11, the system 10 further includes an assembly 80 having a second connector 82, a third arm 84, a fourth arm 86, a pair of second mounting members 88, 90, and a pair of second wheels 92, 94. The third arm 84 is pivotably coupled to the second connector 82 at a first end 91. The third arm 84 extends in a right direction and extends in the normal direction. Similarly, the fourth arm 86 is pivotably coupled to the second connector 82 at a second end 93. The fourth arm 86 extends in a left direction opposite to the right direction and extends in the normal direction. Each of the pair of second mounting members 88, 90 is coupled to a respective second end 96, 98 of the arms 84, 86. Each of the pair of second wheels 92, 94 is coupled to a respective second mounting member 88, 90. Each of the right and left directions is perpendicular to both of the forward direction and the normal direction, as shown in FIG. 11. The arms 84, 86 pivot with a second degree of freedom in the right and left directions, respectively.

Figure 12:
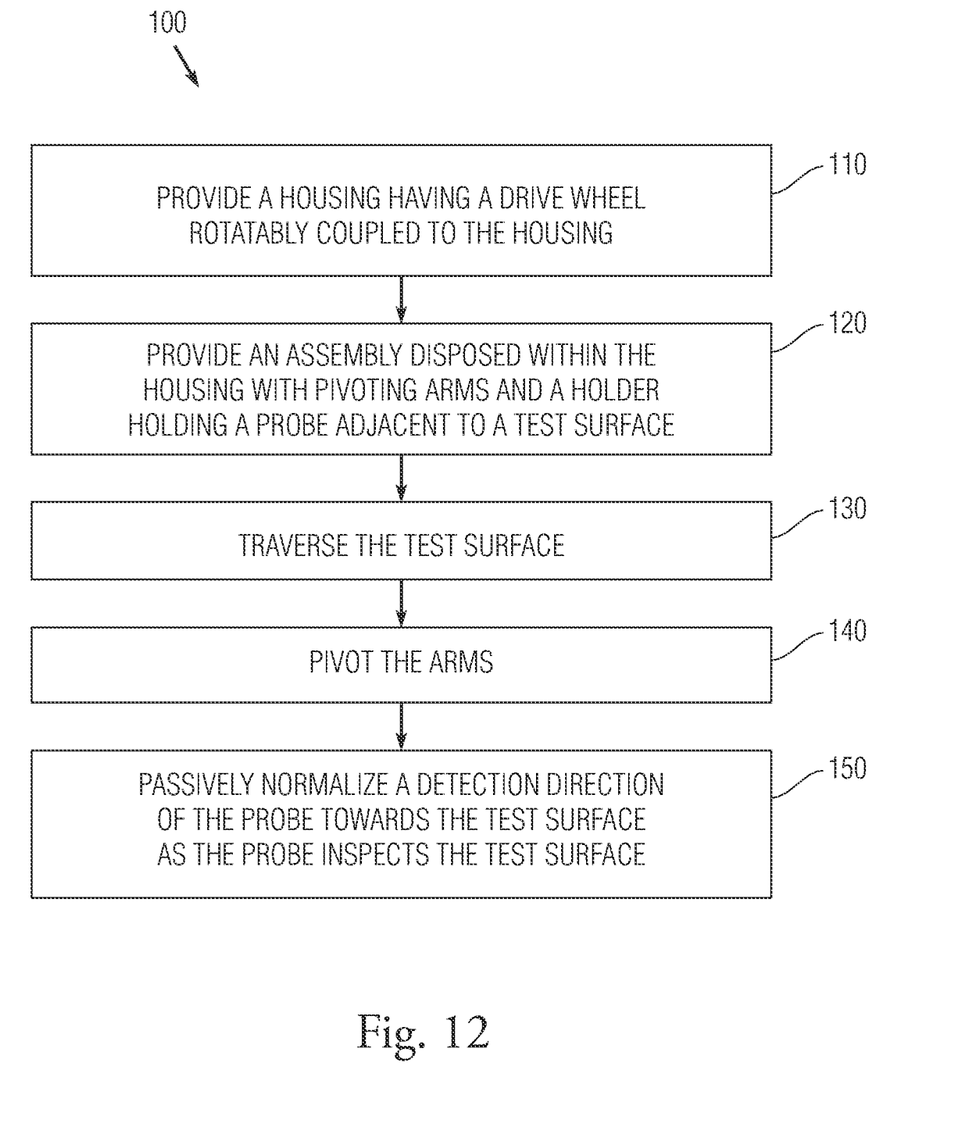
FIG. 12 is a flowchart of operation of the system having the passive normalization assembly of FIGS. 1-11.

In another embodiment, a method 100 includes providing, in step 110, a housing 22 having a drive wheel 24 rotatably coupled to the housing 22. The method 100 also includes providing, in step 120, an assembly 26 disposed within the housing 22 with pivoting arms 42, 44 and a holder 54 holding a probe 12 adjacent to a test surface 14, 18. The method 100 then has at least the probe 12 traverse the test surface 14, 18 in step 130. The method 100 then pivots the arms 42, 44 in step 140 in response to changes in curvature of the test surfaces 14, 18. The method 100 then passively normalizes the detection direction of the probe 12, in step 150, towards the test surface 14, 18 as the probe 12 inspects the test surface 14, 18.

Portions of the methods described herein can be performed by software or firmware in machine readable form on a tangible (e.g., non-transitory) storage medium. For example, the software or firmware can be in the form of a computer program including computer program code adapted to cause the system and assembly to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

Figure 18:
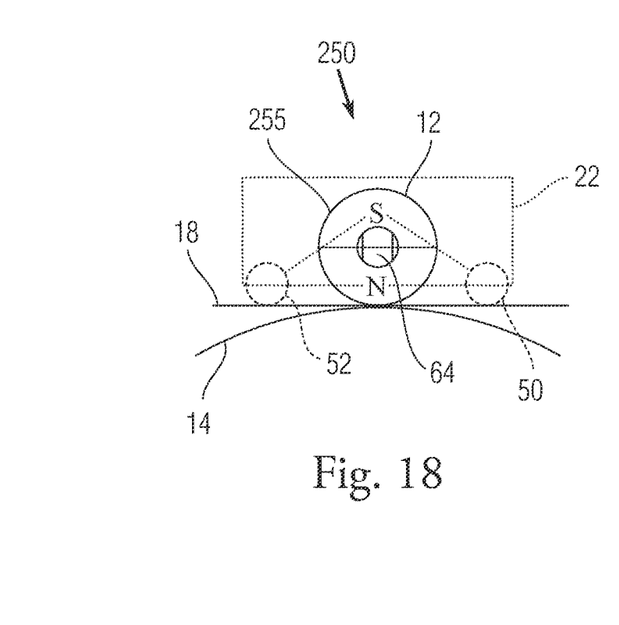
Figure 19:
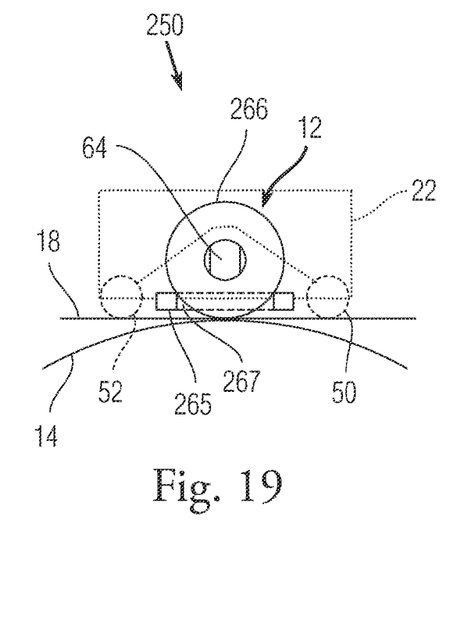

FIGS. 13-19 illustrate alternative embodiments of the system 10 of FIGS. 1-2, utilizing symmetry-preserving mechanisms in the housing 22. Each of the symmetry-preserving mechanisms in FIGS. 13-19 utilize one or more of a resilient member, a linkage, a magnet, and, optionally, gravity (when the system is situated on top of a structure) to balance the wheels 50, 52 on either side of the probe 12 whether the system 10 is on a curved surface 14 or a flat surface 18. The configuration of the wheels 50, 52 on the surface 14, 18 changes such that movement of the wheel 50 in a first direction relative to the probe 12 is mirrored by movement of the wheel 52 in a second direction relative to the probe 12, with the second direction mirroring the first direction about an axis of the probe 12. The axis of the probe passes through the shaft 64. The axis is illustrated by the dotted lines in FIGS. 7-9. Such mirrored movement of the wheels 50, 52, caused by each symmetry-preserving mechanism, maintains the probe 12 in continuous contact with the respective surface 14, 18. As shown in FIGS. 13-17, the continuous contact can be maintained by a push-down compression mechanism, such as a resilient member in the form of a spring. As shown in FIGS. 18-19, the continuous contact can be maintained by a magnet.

The symmetry-preserving mechanisms described herein maintain the symmetry of the wheels 50, 52 and their arms 42, 44 independent of gravity. However, depending on the orientation of the surfaces 14, 18, gravity can provide additional symmetry-preserving forces on the wheels 50, 52 and arms 42, 44. In addition, the symmetry-preserving mechanisms described herein dynamically adjust the configuration of the wheels 50, 52 as the wheels 50, 52 move along the surfaces 14, 18 having different curvatures. Such dynamic adjustment passively normalizes the probe 12 without actuators. Accordingly, the symmetry-preserving mechanisms described herein are less costly to implement than known normalization systems.

Figure 13:
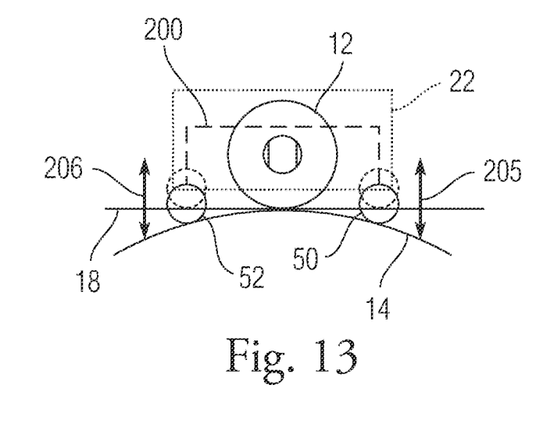
FIGS. 13-19 are side schematic views of alternative embodiments of the crawler of FIGS. 1-2 illustrating symmetry-preserving mechanisms.
Figure 14:
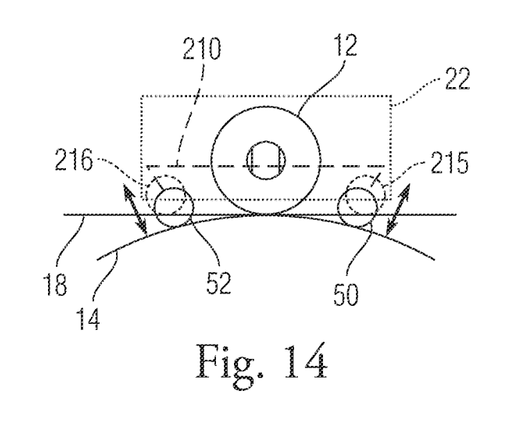
Figure 15:
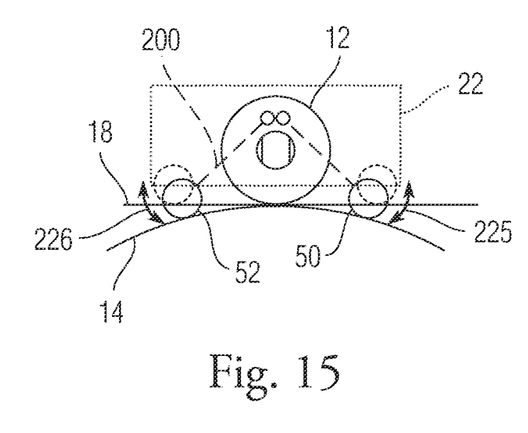
Figure 16:
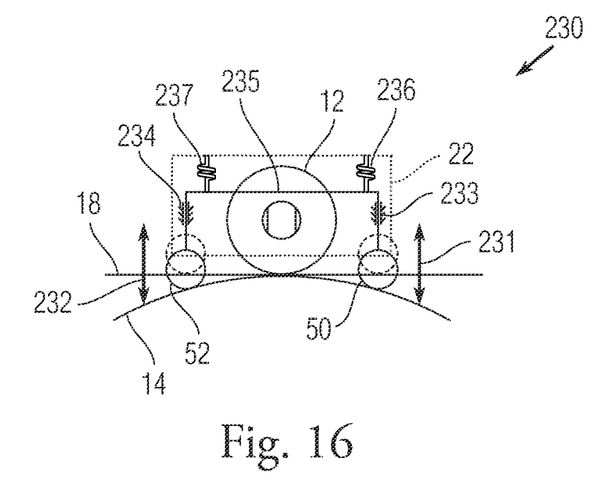
Figure 17:
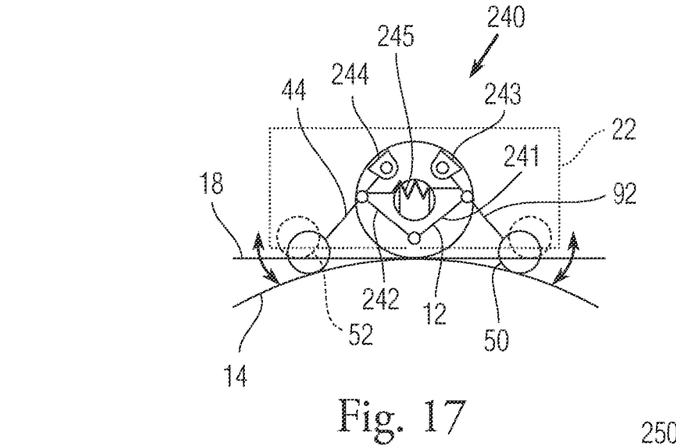

Referring in greater detail to the embodiments in FIGS. 13-19, the system in FIG. 13 has a mechanism 200 configured to have the wheels 50, 52 move in symmetrical linear paths 205, 206 due to and symmetrical linkages. The system in FIG. 14 has a mechanism 210 configured to have the wheels 50, 52 move in symmetrical diagonal paths 215, 216 due to symmetrical linkages. The system in FIG. 15 has a mechanism 220 configured to have the wheels 50, 52 move in symmetrical arc paths 225, 226 due to symmetrical linkages with pivot points. The system in FIG. 16 has a mechanism 230 similar to the mechanism 200 in FIG. 13.

The mechanism 230 has the wheels 50, 52 move in symmetrical linear paths 231, 232 due to symmetrical resilient linkages using a dedicated linear guide 233, 234 for each wheel 50, 52, respectively. The wheels 50, 52 are connected to each other by a translational link 235 between the wheels 50, 52. Resilient members 236, 237 are provided between the translational link 235 and the housing 22. The resilient members 236, 237 can be compression springs. The system in FIG. 17 has a mechanism 240 similar to the system 10 in FIGS. 1-2 using swing arms 42, 44, with the wheels 50, 52 moving in symmetrical arc paths due to symmetrical links 241, 242. However, compared to the mechanism in FIGS. 1-2, the mechanism 240 in FIG. 17 includes a coupling between the arms 42, 44 using links 241, 242, respectively, and grounded revolute joints 243, 244, respectively, with a tension spring 245 between the arms 42, 44.

The systems in FIGS. 18-19 use magnets to maintain strong contact between the probe 12 and the surfaces 14, 18. The wheels 50, 52 move in symmetrical arc paths due to magnetic forces on the linkages attached to the wheels 50, 52. The system in FIG. 18 has a mechanism 250 with two fixed magnetic disks on the shaft 64 of the probe 12, on either lateral side of the probe 12. FIG. 18 illustrates the magnetic disk 255 on a rightward side of the probe 12. One of the two poles S, N on each magnetic disk 255 provides a magnetic force to align the pole with the surface 14, 18. For example, as shown in FIG. 18, the north pole N of the magnetic disk 255 is aligned with the surface 14, 18. Alternatively, the system in FIG. 19 has a mechanism 260 with a static ring magnet 265 mounted rigidly to the shaft 64. The wheel 266 of the probe 12 sits inside a hole 267 in the ring magnet 265, with the ring magnet 265 surrounding a lower part of the wheel 266 of the probe 12. The ring magnet 265 creates a magnetic pulling force for the probe 12 to maintain the probe 12 in continuous contact with the surface 14, 18. In an example embodiment, the ring magnet 265 is diametrically magnetized, with the north pole disposed laterally to the right and the south pole disposed laterally to the left in FIG. 19. In another example embodiment, the ring magnet 265 can be axially magnetized, with the north pole disposed upward along the normal direction, and the south pole disposed downward along the normal direction.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An assembly configured to hold a probe adjacent to a test surface, comprising:
a first connector;
a first arm pivotably coupled to the first connector at a first end thereof, the first arm extending in a forward direction and extending in a normal direction perpendicular to the forward direction and normal to the test surface, the first arm configured to pivot with a first degree of freedom in the forward direction;
a second arm pivotably coupled to the first connector at a first end thereof, the second arm extending in a rearward direction opposite to the forward direction and extending in the normal direction, the second arm configured to pivot with the first degree of freedom in the rearward direction;
a pair of first mounting members each coupled to a respective second end of the first and second arms;
a pair of first wheels each coupled to a respective first mounting member; and
a holder monolithically integral with the first connector and configured to hold the probe,
wherein the pivotable coupling of the first and second arms to the first connector passively normalizes a detection direction of the probe as the probe traverses the test surface.

2. The assembly of claim 1, further comprising:
a first resilient member connected to each of the first and second arms and configured to bias the first and second arms towards each other.

3. The assembly of claim 1, wherein the pair of first wheels are casters.

4. The assembly of claim 1, wherein the holder is coupled to a rotating shaft of the probe and configured to allow the probe to rotate around the rotating shaft.

5. The assembly of claim 1, wherein the first connector includes a first pinion gear.

6. A system configured to traverse a test surface, comprising:
a housing:
a drive wheel rotatably coupled to the housing and configured to traverse the test surface; and
an assembly disposed within the housing and comprising:
a first connector;
a first arm pivotably coupled to the first connector at a first end thereof, the first arm extending in a forward direction and extending in a normal direction perpendicular to the forward direction and normal to the test surface, the first arm configured to pivot with a first degree of freedom in the forward direction;
a second arm pivotably coupled to the first connector at a first end thereof, the second arm extending in a rearward direction opposite to the forward direction and extending in the normal direction, the second arm configured to pivot with the first degree of freedom in the rearward direction;
a pair of first mounting members each coupled to a respective second end of the first and second arms;
a pair of first wheels each coupled to a respective first mounting member; and
a holder monolithically integral with the first connector and configured to hold a probe adjacent to the test surface,
wherein the pivotable coupling of the first and second arms to the first connector passively normalizes a detection direction of the probe towards the test surface as the system with the probe traverses the test surface in response to rotation of the drive wheel.

7. The system of claim 6, further comprising:
a linear motion guide affixed within the housing and configured to guide the assembly linearly relative to the housing.

8. The system of claim 6, further comprising:
a compression-based resilient member disposed between a top surface of the assembly and an interior surface of the housing.

9. The system of claim 6, wherein the pair of first wheels are casters.

10. The system of claim 6, wherein the holder is coupled to a rotating shaft of the probe and configured to allow the probe to rotate around the rotating shaft.

11. The system of claim 6, further comprising:
a first resilient member connected to each of the first and second arms and configured to bias the first and second arms towards each other.

12. An assembly configured to hold a probe adjacent to a test surface, comprising:
a symmetry-preserving sub-assembly;
a first arm coupled to the symmetry-preserving sub-assembly, the first arm extending in a forward direction and extending in a normal direction perpendicular to the forward direction and normal to the test surface, the first arm configured to pivot with a first degree of freedom in the forward direction;
a second arm coupled to the symmetry-preserving sub-assembly, the second arm extending in a rearward direction opposite to the forward direction and extending in the normal direction, the second arm configured to pivot with the first degree of freedom in the rearward direction;
a first wheel coupled to an end of the first arm and configured to move on the test surface;
a second wheel coupled to an end of the second arm and configured to move on the test surface; and a holder coupled to the symmetry-preserving sub-assembly and configured to hold the probe, wherein the coupling of the first and second arms to the symmetry-preserving sub-assembly maintains a symmetrical configuration of the first and second arms about an axis through the probe to passively normalize a detection direction of the probe as the probe traverses the test surface.

13. The assembly of claim 12, wherein as a curvature of the test surface changes, movement of the first arm in a first direction relative to the probe, as the first wheel traverses the test surface, is mirrored by the symmetry-preserving sub-assembly to move the second arm in a second direction relative to the probe with the second direction mirroring the first direction about the axis as the second wheel traverses the test surface.

* * * * *